Patented June 26, 1934

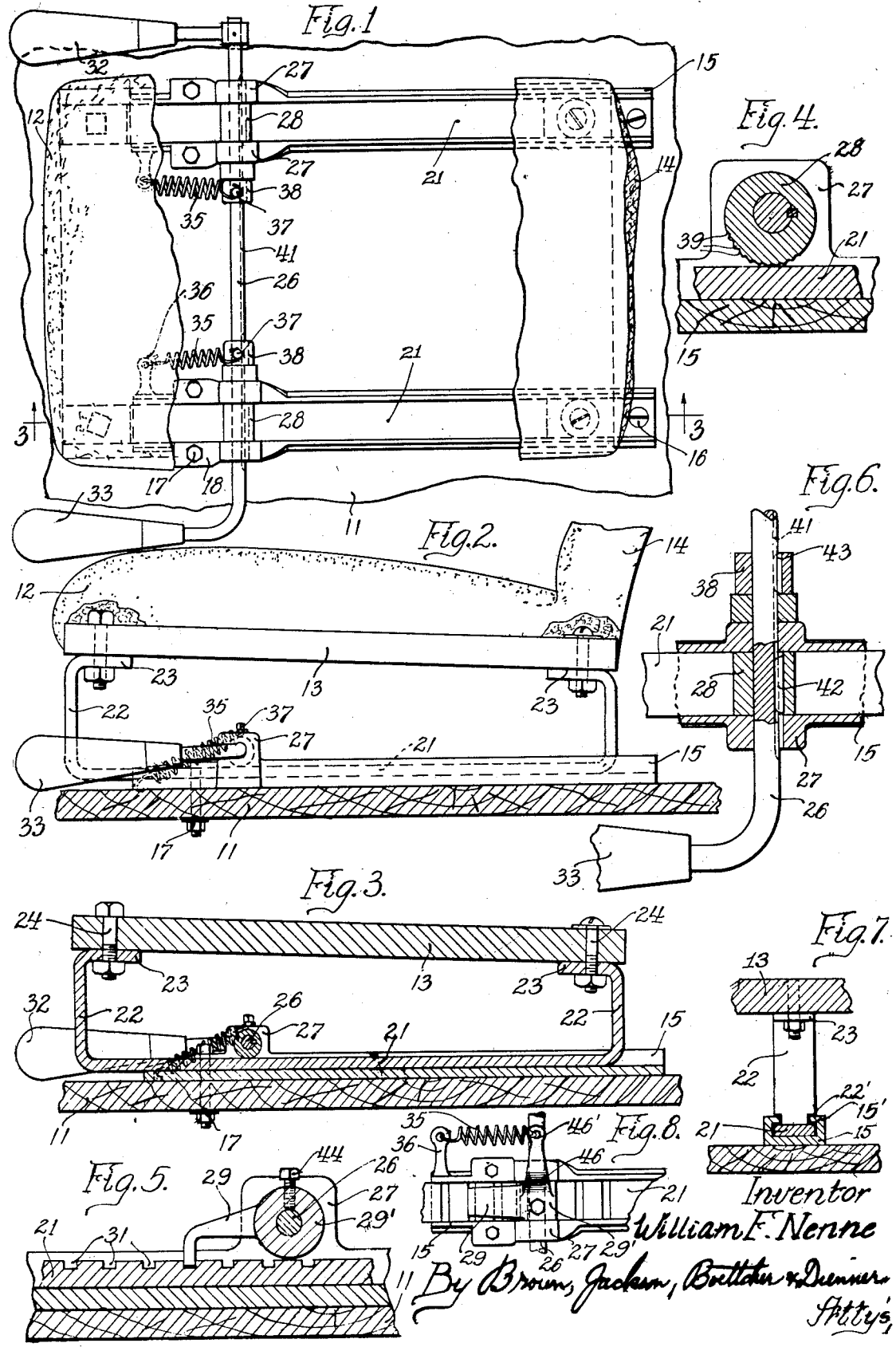

1,964,405

UNITED STATES PATENT OFFICE 1,964,405

ADJUSTABLE SEAT

William F. Nenne, Bloomington, Ill.

Application October 17, 1930, Serial No. 489,271

10 Claims. (Cl. 155—14)

The present invention relates to adjustable seats, and has particular reference to the front seats of automobiles which it is frequently desirable to shift forwardly or rearwardly. In any type of automobile body it is often desirable to shift the driver's seat to adjust the distance between the seat and the pedals. Moreover, in the coach or two-door sedan type of body it is of great advantage to be able to shift the front passenger seat forwardly so as to afford more room for getting into or out of the rear compartment. The adjustable seat of my invention has both of these advantages and is adaptable to any type of automobile body.

One of the principal objects of the invention is to provide a cooperating combination of seat adjusting parts which can be sold as an accessory for interposition between the standard seat and the floor, whereby the regularly equipped seat of the car is utilized in the combination, thus avoiding the expense of a separate seat as part of the accessory equipment and also avoiding the difficulty of matching the design, coloring and trim of the upholstery as would be the case if a special seat were required. In this regard, another object is to provide an adjusting mechanism which will be universally applicable to any size or shape of standard automobile seat. The present structure makes these features possible and commercially practicable by reducing to a minimum the number of parts which must be attached to the seat itself. That is to say, the main actuating parts such as the locking members, the rock shaft which releases these locking members, and the actuating handle and spring means, etc. are all mounted on the stationary guide rails which are secured to the floor. Thus, there is no problem of mounting these devices on different sizes and shapes of automobile seats, the only members which it is necessary to secure to the seat proper being the slides or runners, which in themselves are widely adaptable to different seats.

While this accessory value of the invention is of particular advantage it will of course be understood that, if desired, the seat proper can be constructed as a part of the entire adjusting mechanism, and that the combination may also be utilized as a built-in part of the car.

Another object of the invention is to provide a structure which will permit the adjustable seat to be easily removed from the automobile without the necessity of unfastening the guide rails from the floor or going through other difficult and laborious operations. This is frequently of advantage to the end of affording more ready access to the rear compartment of a two-door coach, or for utilizing the space ordinarily occupied by the front passenger seat in any type of automobile body. Thus, the removal of the front passenger seat in the coach type of body enables trunks, sample cases or luggage to be placed in the rear compartment more easily, and the space formerly occupied by the seat can also be used for transporting articles. The removability of the seat may also be of advantage in affording access to a battery or tool compartment below the floor.

A further object of the invention is to provide a structure which is economical to manufacture, easy to install, which permits of simple, convenient adjustment while still securely holding the seat in each of its adjustments, and which gives a long range of adjustment without necessitating any unsightly arrangement of long guides or like parts. It should also be noted that the present structure is adaptable to use in airplanes for adjusting the position of the pilot's seat relative to the pedal controls.

Referring now to the accompanying drawing in which I have illustrated a preferred embodiment of my invention:

Figure 1 is a plan view of the seat adjusting mechanism, with the seat proper broken away to illustrate the parts;

Fig. 2 is a side elevational view thereof;

Figure 3 is a longitudinal sectional view through one of the guide tracks and slides, taken approximately in the plane of the line 3—3 of Figure 1;

Figure 4 is an enlarged fragmentary sectional view taken on this same plane, illustrating the eccentric type of locking members;

Figure 5 is a generally similar view illustrating a dog type of locking member;

Figure 6 is a horizontal sectional view illustrating one preferred manner of attaching the rotating parts to the locking shaft so that these parts may be readily separated when the seat is to be removed;

Figure 7 is a detail view of a modification wherein the guide rails or tracks have interlocking engagement with the slides; and Figure 8 is a fragmentary plan view showing how the springs may be connected directly to the locking members.

Referring to this drawing, the floor of the automobile body is indicated at 11 and the conventional front seat is indicated at 12. This seat generally comprises a base member 13 in the form of a board or plate to which the padding and upholstery is secured, Figure 2. The back 14 may be fixed to the seat or may be hinged for folding forwardly, as shown.

The seat is adapted to slide on two parallel guide rails or tracks 15 which are fixedly secured to the floor 11. These guides are of channel formation, the rear ends being fastened by bolts 16 passing down through the web portion of the channel and having their heads flush with the upper surface thereof, and the front ends of the guides being secured by bolts 17 passing down through apertured lugs 18 which project from the side flanges of the guides.

Secured to the bottom of the seat 12 are two slides or runners 21 which are adapted to move endwise in the guides 15. These slides are of ordinary bar stock, having their end portions bent upwardly to form the legs 22, and then bent inwardly to form the attaching portions 23. In securing the seat 12 to these slides it is only necessary to drill the baseboard 13 to receive the bolts or screws 24 which secure the attaching portions 23 to the seat, the ordinary supports for mounting the seat having been previously removed.

The locking and releasing of the seat in its endwise adjustment is effected through the oscillation of a transverse shaft 26 which is disposed above the horizontal portions of the slides 21. Projecting upwardly from each side of each guide rail 15 are apertured bearing bosses 27 in which the shaft has bearing support. Mounted on this shaft between each adjacent pair of bosses 27 is a locking member which may be in the form of an eccentric collar as indicated at 28 in Figure 4, or which may be in the form of a dog 29 as indicated in Figure 5. These members are adapted to engage the top surface of the slides 21, and in constructions in which the dog 29 is employed said top surfaces are provided with a plurality of closely spaced notches 31 for receiving the end of the dog. Operating handles are provided at one or both ends of the shaft 26, it being desirable in the case of the front passenger seat of a coach to provide a handle adjacent to the door so that the seat may be readily released from this side so that the seat may be slid forwardly to give access to the rear compartment. Where two handles are provided one of these should be removable from the shaft so that the latter can be withdrawn endwise, such arrangement being illustrated in Figure 1 in which the handle 32 is detachably mounted on the shaft as by a set screw 32a, and the handle 33 is fixedly secured to the forwardly bent end of the shaft. If desired, either of the handles may be omitted. The locking members 28 or 29 are so arranged on the shaft 26 whereby the weight of the handle or handles 32, 33 tending to rock downwardly functions to move these members 28 or 29 into locking engagement with the slides 21 so that the handles thus serve as means normally tending to swing these locking members into locking position. However, it is generally preferable to make this action more positive by employing tension springs 35, 35 which have their front ends connected to extensions 36 projecting inwardly from the guide tracks and which have their rear ends hooked to arms or set screws 37 carried by collars 38 which are mounted on the shaft 26 between the guide tracks. These springs together with the weight of the handle or handles hold the locking members in firm engagement with the slides 21 for rigidly holding the seat in its adjusted position. Where the eccentric collars 28 are employed they are so placed on the shaft 26 that rearward pressure against the seat, transmitted through the slides 21, acts to cause these eccentric members to bind more tightly against the top surfaces of the slides, and to this end the operative surfaces of the eccentrics may be provided with transverse teeth or serrations 39. To adjust the seat it is only necessary to swing one of the handles upwardly, which releases the locking members 28 or 29 from their engagement with the slides, and permits the seat to be shifted forwardly or rearwardly.

The removal of the seat is effected by withdrawing the shaft 26 endwise from its bearing bosses 27, thereby enabling the locking members 28 or 29 to be removed from their positions above the slides 21 and permitting the slides to be removed from the guide tracks 15. In replacing the shaft it is desirable that the locking members 28 or 29 and the collars 38, through which the spring pressure is transmitted, be mounted in a certain angular relation to the shaft and to each other. One method of insuring this is to provide the shaft with a continuous longitudinal keyway 41 (Figure 6) and to provide the locking members, either 28 or 29, with keys 42 and the collars 38 with keys 43 which are so arranged that they will only register with the keyway 41 when the locking members and collars are in their proper angular relation to the shaft and to each other. In lieu of this keyed relation each locking member and each collar may be provided with a set screw, as represented by the set screw 44 in the dog 29 of Figure 5, by which each locking member and collar can be secured to the shaft in the proper angular relation.

By constructing the slides substantially as shown with the attaching portions 23 bent inwardly the horizontal runner portions 21 are given an effective length substantially equal to the depth of the seat so that a wide range of adjustment is afforded, the limits of this adjustment being defined by the end legs 22 engaging the locking members 28 or 29. Thus, the occupant of the front passenger seat in a coach can slide this seat forwardly, while still remaining in it, sufficiently far to give wide access to the rear compartment. Because the sliding members carried by the seat are substantially the length of the guides 15 and the width of the seat and are continuous from end to end, (see Figures 2 and 3) a stable bearing support is given the seat even in its extreme forwardly adjusted positions. Because of this long length of engagement between the slides 21 and the guides 15 the latter do not need to be any longer than approximately the depth of the seat so that when the seat is in its normal position these guides do not extend objectionably into the rear compartment. In the construction illustrated in Figures 1 to 6, inclusive, the guides 15 have straight side flanges so that when the shaft 26 and locking members 28 or 29 are removed the seat slides 21 can be lifted directly out of the guides. It will be noted that in this construction the rear end of the seat is prevented from rocking upwardly when in an extreme forward position by the eccentrics 28 bearing downwardly upon the tops of the slides 21, or by the hub portions 29' of the dogs 29 contacting with these top surfaces of the slides. In Figure 7 I have illustrated a modified construction in which the guide tracks 15 have inwardly turned flanges 15' at their upper edges which lap over the tops of the slides 21 and securely hold the latter against any rocking movement. In this construction both legs 22 at the front and rear ends of the slides 21 have notches 22' formed in their side edges and registering with overlying flanges 15'. When the shaft and locking members are removed preparatory to removing the seat the slides 21 are merely slid rearwardly out of engagement with the guide rails 15. It will be evident that the cooperating pairs of guide tracks 15 and slides 21 can be spaced apart at different distances because the locking members 28 or 29 and the collars 38 can be secured to the shaft 26 at different points along the length thereof. By establishing the locked relation at both sides of the seat between each slide and its cooperating guide rail the locking is made doubly secure and the seat is also held against any possibility of side skewing or looseness which might result from uneven pressure against the seat. In both locking arrangements illustrated in Figures 4 and 5 the pressure of the springs 35 acting through the locking members 28 and 29 increases the downward frictional pressure of the slides against the guide rails for firmly holding the seat against vibration, and this downward pressure can be materially increased in the construction using the eccentrics 28 by forcing the handle downwardly.

In Figure 8 I have illustrated an alternative construction permitting the springs 35 to be connected directly to the locking members 28 or 29. In such construction each locking member is provided with an arm 46 preferably formed integral therewith, this arm arching upwardly from the top of the locking member and then projecting horizontally inwardly across the top of the inner bearing boss 27 to dispose the apertured end 46' of this arm in position to receive the hooked end of the tension spring 35. The provision of these arms on the locking members completely eliminates the necessity for the collars 38, and results in the two locking members being the only devices which it is necessary to remove from or replace on the shaft when the shaft is withdrawn for removing the seat. In Figure 8 I have shown these arms 46 as extending from the dog type of locking member 29, but it will be evident that the same arrangement of arms may be employed when using the eccentric type of locking member 28, the arms similarly being formed as extensions therefrom. The provision of these arms is advantageous in that the springs are thereby always made effective to swing the locking members down into locking engagement with the slides 21, even though through inadvertence the locking members may have become loosened on the shaft. The locking members provided with these arms may, of course, be secured to the shaft by the set screws 44 or may have a keyed engagement with the shaft, as by the provision of the keys 42.

Having thus described my invention what I claim as new and desire to secure by Letters Patent is:

1. In a movable seat for vehicles, two channel shaped guide rails adapted to be secured to the vehicle floor, a pair of U-shaped slides adapted to have their end legs secured to the seat and to have their horizontal base portions slide endwise in said guide rails, a pair of bearing bosses projecting upwardly from each guide rail on opposite sides thereof, a shaft extending through the four bosses of the two rails and rotatable therein, said shaft extending above the horizontal base portions of said slides, latch means mounted on said shaft one between the bosses of each pair, said latch means being adapted to rotate downwardly into locking engagement with said slides, and means connecting said latch means with said shaft to rotate therewith into and out of locking engagement with said slides.

2. In a movable seat for vehicles, two guide rails adapted to be secured to the vehicle floor, a pair of U-shaped slides adapted to have their end legs secured to the seat and to have their horizontal base portions slide endwise in said guide rails, a pair of bearing bosses projecting upwardly from each guide rail on opposite sides thereof, shaft means extending through the four bosses of the two rails and rotatable therein, said shaft extending above the horizontal base portions of said slides, eccentric collars releasably mounted on said shaft between said pairs of bosses and adapted to rotate downwardly into locking engagement with the base portions on said slides when said shaft is rotated, and means detachably securing said collars to said shaft and providing for removal of the shaft means and collars to permit removal of the seat from the guide rails upon detaching said collars.

3. The combination with an adjustable seat of the class described, of two guide rails adapted to be secured to a vehicle floor, a pair of slides secured to said seat and adapted to move endwise in said guide rails, a pair of bearing bosses projecting upwardly from each guide rail on opposite sides thereof, a rotatable shaft extending through the four bosses of the two rails, said shaft extending above the horizontal base portions of said slides, and locking dogs mounted on said shaft between the bosses of each pair, each of said dogs comprising a hub portion having a bearing on the upper surface of each of said slides for holding them in said guide rails and a detent portion adapted to engage in openings in each of said slides for releasably holding them against movement longitudinally in said channels.

4. A movable vehicle seat comprising a pair of guide rails having lug means projecting upwardly therefrom, a pair of slides secured to the seat and having portions shiftable along said guide rails below said lug means, a transverse locking shaft carried by said lug means and disposed above said portions, and locking devices carried by said shaft and adapted to contact with the upper face of said portions to hold said slides down against said guide rails, both in locked and unlocked position, said locking devices movable into and out of locking relation with said slides to hold the seat in adjusted position.

5. In a movable seat for vehicles, two laterally spaced guide rails adapted to be secured to the vehicle floor, a pair of laterally spaced slides adapted to be secured to the seat and arranged to slide endwise on said guide rails, bearing members mounted on said rails adjacent the forward end thereof, transverse shaft means extending through said bearing members and rotatable therein, laterally spaced locking devices mounted on said shaft means above the slides and adapted to move into and out of locking engagement therewith, spring means operatively connected directly with said devices to urge the latter into locking engagement with said slides, and a handle connected to said shaft means for moving said locking devices out of locking engagement with said slides.

6. In a movable seat for vehicles, two laterally spaced guide rails adapted to be secured to the vehicle floor, a pair of laterally spaced slides adapted to be secured to the seat and arranged to slide endwise on said guide rails, said rails and slides having cooperating overlapping surfaces near one end for preventing upward separation of said slides from said rails, bearing members mounted on said rails adjacent said overlapping surfaces, transverse shaft means extending through said bearing members and rotatable therein, laterally spaced locking devices mounted on said shaft means above the slides and adapted to move into and out of locking engagement therewith, spring means operatively connected directly with said devices to urge the latter into locking engagement with said slides, and a handle connected to said shaft means for moving said locking devices out of locking engagement with said slides.

7. In a movable seat for vehicles, two guide rails having flange means and adapted to be secured to the vehicle floor, a pair of U-shaped slides adapted to have their end legs secured to the seat and to have their horizontal base portions slide endwise in said guide rails, at least one stationary bearing boss projecting upwardly from each guide rail, shaft means extending through said bosses and rotatable therein, said shaft means extending above the horizontal base portions of said slides, locking devices mounted on said shaft one adjacent each of said bosses and both adapted to move into locking engagement with said slides only, when said shaft is rotated in one direction, an arm carried by each of said locking devices, and spring means connected directly with said arms tending to move said locking devices into locking engagement.

8. A vehicle seat comprising guide rails adapted to be secured to the vehicle floor, slides secured to the seat and having horizontal base portions movable endwise in said guide rails, bearing bosses projecting upwardly from said guide rails, shaft means extending through the bosses of the rails and rotatable therein, said shaft means extending above the horizontal base portions of said slides, and locking devices mounted on said shaft means adjacent said bosses and adapted to rotate downwardly into locking engagement with said slides, each of said devices having an arcuate body portion adapted to contact with the upper surface of each of said portions of the slides for holding the slide in said guide rails and a detent portion adapted to engage said slides for releasably holding them against movement longitudinally of said guide rails.

9. An adjustable vehicle seat comprising two guide rails adapted to be secured to the vehicle floor, a pair of U-shaped slides adapted to move endwise in said guide rails, said guide rails having flanges to prevent displacement of the slides relative thereto, bearing bosses projecting upwardly from said guide rails, rotatable shaft means extending through said bosses and above the horizontal base portions of said slides, locking means mounted on said shaft means adjacent said bosses, and means for urging each of said locking means into engagement with said slides and including an arm extending from a flange and a lug carried by the locking means.

10. An adjustable vehicle seat comprising two guide rails adapted to be secured to the vehicle floor, a pair of slides adapted to move endwise in said guide rails, said guide rails having flanges to prevent displacement of the slides relative thereto, bearing bosses projecting upwardly from said guide rails, rotatable shaft means extending through said bosses and above the horizontal base portions of said slides, locking means including locking dogs mounted on said shaft means adjacent said bosses, means detachably securing the locking dogs to the shaft, detachment of said dogs providing for removal of the shaft means from said bosses to free the seat from the guide rails, and means for urging each of said locking dogs into engagement with said slides and comprising an arm extending from a flange and a lug carried by the locking dog, said means being detachable.

WILLIAM F. NENNE.